United States Patent
Suzuki

(10) Patent No.: US 10,284,539 B2
(45) Date of Patent: May 7, 2019

(54) CONTROL APPARATUS, IMAGE FORMING APPARATUS, AND NON-TRANSITORY COMPUTER READABLE MEDIUM THAT CONTROLS EXECUTION OF A PROCESS

(71) Applicant: FUJI XEROX CO., LTD., Tokyo (JP)

(72) Inventor: Takahiko Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/692,507

(22) Filed: Aug. 31, 2017

(65) Prior Publication Data
US 2018/0270212 A1 Sep. 20, 2018

(30) Foreign Application Priority Data
Mar. 17, 2017 (JP) .................... 2017-052320

(51) Int. Cl.
| G06K 15/00 | (2006.01) |
| H04L 29/06 | (2006.01) |
| H04N 1/44 | (2006.01) |
| G03G 15/00 | (2006.01) |
| G06F 21/82 | (2013.01) |
| G06F 21/60 | (2013.01) |

(52) U.S. Cl.
CPC ......... *H04L 63/08* (2013.01); *G03G 15/5091* (2013.01); *G06F 21/82* (2013.01); *H04N 1/44* (2013.01); *G06F 21/608* (2013.01); *G06F 2221/2149* (2013.01)

(58) Field of Classification Search
None
See application file for complete search history.

(56) References Cited

U.S. PATENT DOCUMENTS

| 8,411,294 | B2 * | 4/2013 | Inoue | G06F 3/1208 358/1.13 |
| 8,621,469 | B2 * | 12/2013 | Sakai | G06F 21/608 358/1.13 |
| 9,436,423 | B2 * | 9/2016 | Doui | G06F 3/1236 |
| 2006/0026434 | A1 * | 2/2006 | Yoshida | G06F 21/608 713/182 |
| 2007/0226808 | A1 * | 9/2007 | Uchikawa | G06F 21/608 726/27 |

(Continued)

FOREIGN PATENT DOCUMENTS

| JP | H11-134136 A | 5/1999 |
| JP | 2007-257529 A | 10/2007 |

(Continued)

*Primary Examiner* — Dung D Tran
(74) *Attorney, Agent, or Firm* — Oliff PLC

(57) ABSTRACT

A control apparatus includes a storage unit, a reception unit, and a restriction unit. The storage unit stores, for each of categories of processes classified in accordance with a condition related to a timing of a process, whether or not it is possible for each user to use processes that belong to the category. The reception unit receives an instruction for a process. The restriction unit specifies a category to which the process indicated in the instruction received by the reception unit belongs. In a case where use of processes that belong to the specified category is not permitted for a user that provided the instruction in the storage unit, the restriction unit restricts execution of the process according to the instruction.

20 Claims, 10 Drawing Sheets

| TYPE NAME | TIMING | FOLDER | AUTHENTICATION | CONFIRMATION | POST-PROCESSING | ... |
|---|---|---|---|---|---|---|
| JA | INSTANTLY | PERSONAL | REQUIRED | NOT REQUIRED | TO BE DELETED | ... |
| JB | WHEN CONFIRMED | SHARED | REQUIRED | REQUIRED | TO BE RETAINED | ... |
| JC | WHEN DESIGNATED | SHARED | – | NOT REQUIRED | TO BE RETAINED | ... |
| JD | × | PURPOSE-SPECIFIC | NOT REQUIRED | NOT REQUIRED | TO BE DELETED | ... |
| ... | ... | ... | ... | ... | ... | ... |

~120

(56) References Cited

U.S. PATENT DOCUMENTS

| | | | | |
|---|---|---|---|---|
| 2008/0079990 A1* | 4/2008 | Iida | ............ | G06F 21/608 |
| | | | | 358/1.15 |
| 2008/0130026 A1* | 6/2008 | Mizuno | ............ | G06F 21/608 |
| | | | | 358/1.9 |
| 2008/0134186 A1* | 6/2008 | Sakai | ............ | G06F 21/608 |
| | | | | 718/102 |
| 2009/0268225 A1* | 10/2009 | Sugiyama | ............ | G06F 3/1203 |
| | | | | 358/1.14 |
| 2009/0276846 A1* | 11/2009 | Kotaka | ............ | G06F 21/608 |
| | | | | 726/17 |
| 2010/0014110 A1* | 1/2010 | Munetomo | ............ | H04N 1/0084 |
| | | | | 358/1.14 |
| 2012/0075657 A1* | 3/2012 | Yamamoto | ............ | B41J 13/0036 |
| | | | | 358/1.14 |
| 2014/0215576 A1* | 7/2014 | Sugiyama | ............ | H04N 1/44 |
| | | | | 726/4 |
| 2014/0372514 A1* | 12/2014 | Doui | ............ | G06F 3/1236 |
| | | | | 709/203 |

FOREIGN PATENT DOCUMENTS

| | | |
|---|---|---|
| JP | 2014-027357 A | 2/2014 |
| JP | 2014-149562 A | 8/2014 |

\* cited by examiner

| TYPE NAME | TIMING | FOLDER | AUTHENTICATION | CONFIRMATION | POST-PROCESSING |
|---|---|---|---|---|---|
| JA | INSTANTLY | PERSONAL | REQUIRED | NOT REQUIRED | TO BE DELETED |
| JB | WHEN CONFIRMED | SHARED | REQUIRED | REQUIRED | TO BE RETAINED |
| JC | WHEN DESIGNATED | SHARED | — | NOT REQUIRED | TO BE RETAINED |
| JD | X | PURPOSE-SPECIFIC | NOT REQUIRED | NOT REQUIRED | TO BE DELETED |
| ... | ... | ... | ... | ... | ... |

| USER NAME | TYPE NAME |
|---|---|
| UA | JA, JB |
| UB | JC |
| UC | JD, JE |
| ... | ... |

FIG. 8

| USER NAME | TYPE NAME | | | | | | |
|---|---|---|---|---|---|---|---|
| | JA | JB | JC | JD | JE | JF | JG |
| UA | 100 | 90 | 100 | 0 | 0 | 0 | 0 |
| UB | 50 | 60 | 0 | 0 | 0 | 0 | 0 |
| UC | 30 | 10 | 40 | 90 | 90 | 0 | 0 |
| UD | 40 | 10 | 50 | 90 | 40 | 40 | 40 |
| ... | ... | ... | ... | ... | ... | ... | ... |

| USER NAME | MORNING | AFTERNOON |
|---|---|---|
| | TYPE NAME | TYPE NAME |
| UA | JA, JB | JA |
| UB | JC | JC |
| UC | JD, JE | JD, JE |
| UD | JB, JF | JB, JF, JG |
| ... | ... | ... |

| GROUP NAME | MISSION NAME |
|---|---|
| G1 | RC |
| G2 | RA |
| G3 | RD |
| G4 | RB |
| ... | ... |

| USER NAME | MISSION NAME | | | | | | AUTHORITY COMPUTATION SETTING |
|---|---|---|---|---|---|---|---|
| | RA | RB | RC | RD | RE | ... | |
| UA | ○ | ○ | ○ | ○ | × | ... | PRODUCT |
| UB | ○ | ○ | ○ | × | × | ... | SUM |
| UC | ○ | ○ | × | × | ○ | ... | PRODUCT |
| UD | ○ | × | × | × | × | ... | SUM |
| ... | ... | ... | ... | ... | ... | ... | ... |

| USER NAME | MORNING MISSION NAME | AFTERNOON MISSION NAME |
|---|---|---|
| UA | RA, RB | RC |
| UB | RA | RA, RD |
| UC | RC, RD | RD |
| UD | RC | RC |
| ... | ... | ... |

| USER NAME | LOW OPERATION TYPE NAME | HIGH OPERATION TYPE NAME |
|---|---|---|
| UA | JA, JB | JA |
| UB | JC | JC |
| UC | JD, JE | JD, JE |
| UD | JB, JF | JB, JF, JG |
| ... | ... | ... |

121

CONTROL APPARATUS, IMAGE FORMING APPARATUS, AND NON-TRANSITORY COMPUTER READABLE MEDIUM THAT CONTROLS EXECUTION OF A PROCESS

CROSS-REFERENCE TO RELATED APPLICATIONS

This application is based on and claims priority under 35 USC 119 from Japanese Patent Application No. 2017-052320 filed Mar. 17, 2017.

BACKGROUND

Technical Field

The present invention relates to a control apparatus, an image forming apparatus, and a non-transitory computer readable medium.

SUMMARY

According to an aspect of the present invention, there is provided a control apparatus including: a storage unit that stores, for each of categories of processes classified in accordance with a condition related to a timing of a process, whether or not it is possible for each user to use processes that belong to the category; a reception unit that receives an instruction for a process; and a restriction unit that specifies a category to which the process indicated in the instruction received by the reception unit belongs, and that restricts, in a case where use of processes that belong to the specified category is not permitted for a user that provided the instruction in the storage unit, execution of the process according to the instruction.

BRIEF DESCRIPTION OF THE DRAWINGS

An exemplary embodiment of the present invention will be described in detail based on the following figures, wherein:

FIGS. 4A and 4B illustrate an example of a type table and an example of a permission table, respectively;

FIG. 8 illustrates an example of the permission table according to Modification 1;

FIG. 9 illustrates an example of the permission table according to Modification 2;

FIG. 12 illustrates an example of a fourth permission table in which mission names are assigned to group names;

FIG. 13 illustrates an example of the fourth permission table according to Modification 9;

FIG. 14 illustrates an example of the fourth permission table according to Modification 11;

FIG. 15 illustrates an example of the permission table in which different missions are assigned to each operating state;

DETAILED DESCRIPTION

1. Exemplary Embodiment 1-1. Overall Configuration of Image Forming System

Figure 1:
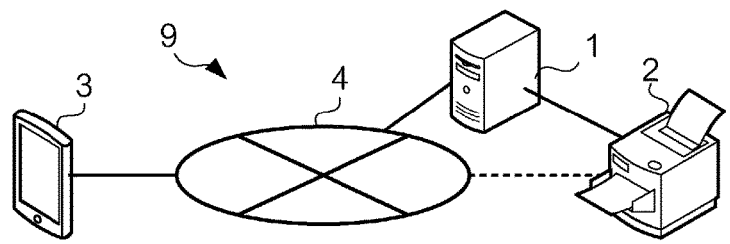
FIG. 1 illustrates the overall configuration of an image forming system according to an exemplary embodiment.

FIG. 1 illustrates the overall configuration of an image forming system 9 according to an exemplary embodiment. The image forming system 9 includes a communication line 4 that forms a local area network (LAN), and a server device 1 and a terminal 3 connected to the communication line 4. The image forming system 9 also includes an image forming apparatus 2 connected to the server device 1 to be controlled by the server device 1. The image forming apparatus 2 may be connected to the communication line 4 to be controlled by the server device 1.

The terminal 3 illustrated in FIG. 1 is an information processing device connected to the image forming apparatus 2 via the communication line 4 and the server device 1. The image forming system 9 may include one terminal 3 as illustrated in FIG. 1, or may include plural terminals 3. The terminal 3 is connected to the server device 1 via the communication line 4, and instructs the image forming apparatus 2 to form an image via the server device 1.

The image forming apparatus 2 illustrated in FIG. 1 forms an image on a medium in accordance with an instruction received from the terminal 3. The image forming apparatus 2 forms an image on a medium such as paper through electrophotography, a thermal transfer system, an inkjet system, or the like, for example. The image forming system 9 may include one image forming apparatus 2 as illustrated in FIG. 1, or may include plural image forming apparatuses 2.

1-2. Configuration of Image Forming Apparatus

Figure 2:
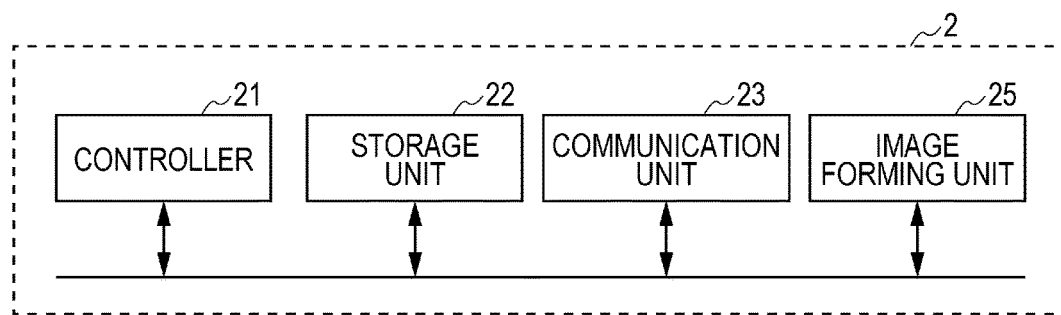
FIG. 2 illustrates the configuration of an image forming apparatus.

FIG. 2 illustrates the configuration of the image forming apparatus 2. The image forming apparatus 2 includes a controller 21, a storage unit 22, a communication unit 23, and an image forming unit 25. The image forming apparatus 2 may also include an operation unit that receives an operation by a user, and a display unit that displays an image etc. to the user.

The controller 21 includes a central processing unit (CPU), a read only memory (ROM), and a random access memory (RAM). The CPU reads and executes computer programs (hereinafter referred to simply as "programs") stored in the ROM or the storage unit 22 to control the various units of the image forming apparatus 2.

The storage unit 22 is a mass storage unit such as a hard disk drive, and stores the various programs to be read into the CPU of the controller 21. The storage unit 22 may store image data that are sent from the terminal 3 and that indicate an image.

The communication unit 23 is a communication line connected to the server device 1 through a wire or wirelessly. The communication unit 23 may have a function of connecting to the communication line 4.

The image forming unit 25 forms a designated image on a medium through electrophotography or the like. The image forming unit 25 includes an image holding member such as a photosensitive drum, a charger, an exposure device, a developer, a transfer machine, a fixer, and so forth. The image holding member holds a latent image when the surface thereof is irradiated with light to cause a potential difference. The charger charges the surface of the image holding member. The exposure device irradiates the image holding member with light. The developer supplies the surface on which the latent image is held with a developer such as a toner to which a charge has been applied. The transfer machine transfers an image formed using the developer from the image holding member to the medium. The fixer applies heat to the medium to fix the image which has been transferred onto the medium.

1-3. Configuration of Server Device

Figure 3:
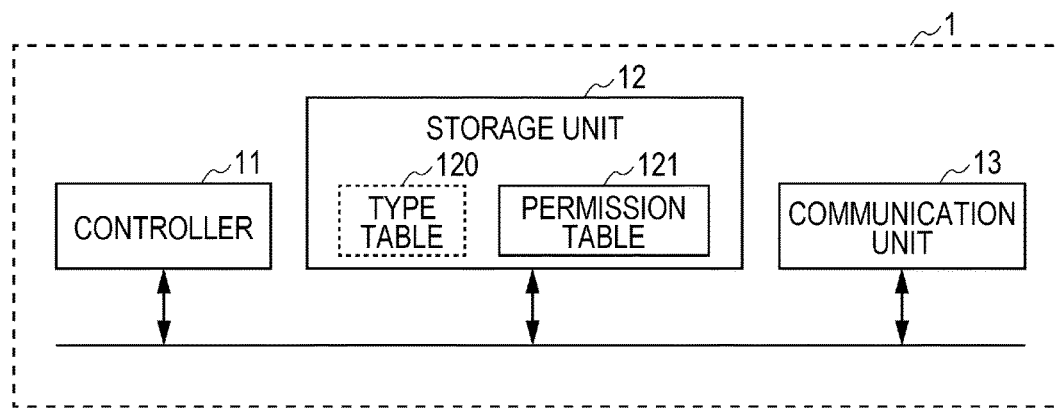
FIG. 3 illustrates the configuration of a server device.

FIG. 3 illustrates the configuration of the server device 1. The server device 1 is an example of a control apparatus that is connected to the image forming apparatus 2 directly or via the communication line 4, and that controls the image forming apparatus 2. The server device 1 includes a controller 11, a storage unit 12, and a communication unit 13. The server device 1 may also include an operation unit that receives an operation by a user, and a display unit that displays an image etc. to the user.

The controller 11 includes a CPU, a ROM, and a RAM. The CPU reads and executes programs stored in the ROM or the storage unit 12 to control the various units of the server device 1.

The communication unit 13 is a communication line connected to the image forming apparatus 2 through a wire or wirelessly. The communication unit 13 is connected to the communication line 4 through a wire or wirelessly. The communication unit 13 may be connected to the image forming device 2 via the communication line 4.

The storage unit 12 is a mass storage unit such as a hard disk drive, and stores the various programs to be read into the CPU of the controller 11. The storage unit 12 also stores a type table 120 and a permission table 121.

The type table 120 stores the types (hereinafter referred to also as "categories") of processes to be executed by the image forming apparatus 2 in correlation with the content of the processes. The types of processes are classified in accordance with at least a condition related to the timing of image formation.

The permission table 121 stores the possibility of use by each user for each of the types of processes classified in accordance with the condition related to the timing of image formation. For example, the permission table 121 indicates, for each user, identification information on processes that belong to types that the user is permitted to use. Thus, the storage unit 12 which stores the permission table 121 is an example of a storage unit that stores, for each of categories of processes classified in accordance with a condition related to the timing of image formation, whether or not it is possible for each user to use processes that belong to the category.

FIGS. 4A and 4B illustrate an example of the type table 120 and an example of the permission table 121, respectively. In the type table 120 illustrated in FIG. 4A, type names for identification of the types of processes and various conditions related to image formation are correlated with each other. The conditions of image formation include a "timing" that indicates the timing of image formation, a "folder" that indicates a region for storage of image data to be used in image formation, an "authentication" that indicates whether or not to authenticate the user before image formation, a "confirmation" that indicates whether or not to request a confirmation before image formation, a "post-processing" that indicates whether or not to delete image data used in image formation after execution of the image formation, and so forth.

Image formation is executed at the timing decided in accordance with an instruction after image data are stored (or accumulated) in the storage unit 22 of the image forming apparatus 2, for example. For example, if the timing of image formation is "instantly", the image forming apparatus 2 executes image formation with the server device 1 or the image forming apparatus 2 receiving an instruction from the terminal 3 as an impetus, for example. In this case, "instantly" means the timing of image formation that matches the timing of reception of an instruction. If the timing of image formation is "when confirmed", the image forming apparatus 2 executes image formation after the user has performed an operation to confirm that "an image formation process may be executed" using the operation unit of the server device 1 or the image forming apparatus 2. If the timing of image formation is "when designated", the image forming apparatus 2 executes image formation when a designated time included in an instruction has come, for example.

If the "folder" is "personal", the image data are to be accumulated in a folder assigned to the user as an individual. If the "folder" is "shared", the image data are to be accumulated in a folder shared by plural users. If the "folder" is "purpose-specific", the image data are to be accumulated in a folder assigned to each purpose of use.

By combining such conditions, the types of processes include: a type in which image formation is restricted using a password after accumulation of image data; a type in which image formation is performed without requesting a password after accumulation; a type in which image data are not deleted after image formation; a type in which image formation is executed at a designated time; and so forth. The types of processes also include: a type in which image formation is performed for only one copy and, after confirmation, image formation is performed for the remaining copies to prepare plural copies of a document; a type in which image formation is executed when a facsimile or a mail is received using a data accumulation region of facsimile software or mail software; and so forth.

The "various conditions related to image formation" indicated in the type table 120 are not limited to those discussed above. For example, in the case where information (referred to as "instruction information") related to instructions for image formation performed using image data is accumulated, together with the image data, as a queue in the storage unit 12 of the server device 1, for example, the type table 120 may store whether or not the user has the "retrieval" authority to retrieve and view any piece of the instruction information discussed above from the queue and provide an instruction (final instruction).

The retrieval authority may be provided to the users unconditionally, may be provided to only authenticated users, or may be provided when the user has provided required information. The information required by the image forming apparatus 2 may be a personal identification number (PIN) code determined in advance or issued when the image forming apparatus 2 or the like received an instruction (first instruction) or the like, a password, or the like, for example.

The controller 11 of the server device 1 references the type table 120 to specify, from the content of an instruction from the user received by the communication unit 13, the type of a process that matches a condition for image formation included in the instruction.

The permission table 121 illustrated in FIG. 4B stores user names for identification of users and type names as identification information on the types of processes permitted for the users identified with the user names in correlation with each other. According to the permission table 121 illustrated in FIG. 4B, a user identified with a user name "UA" is permitted to use processes that belong to types identified with type names "JA" and "JB", for example.

1-4. Configuration of Terminal

Figure 5:
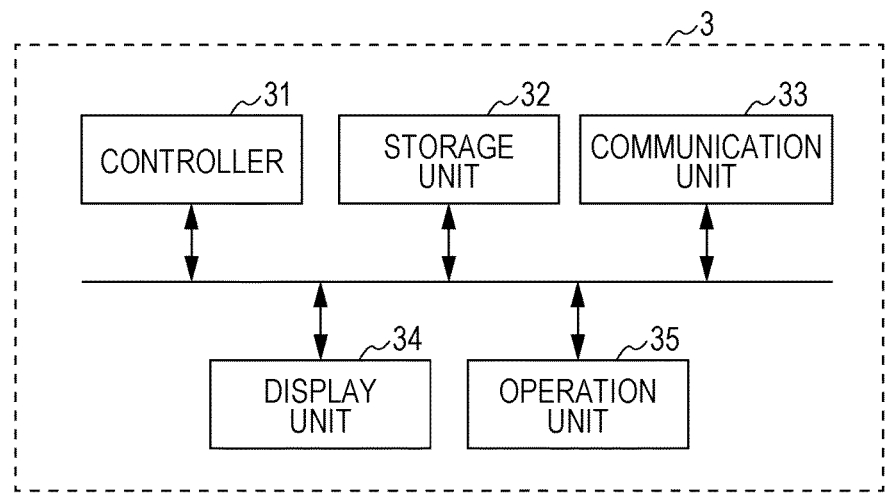
FIG. 5 illustrates an example of the configuration of a terminal.

FIG. 5 illustrates an example of the configuration of the terminal 3. The terminal 3 includes a controller 31, a storage unit 32, a communication unit 33, a display unit 34, and an operation unit 35.

The controller 31 includes a CPU, a ROM, and a RAM. The CPU reads and executes programs stored in the ROM or the storage unit 32 to control the various units of the terminal 3.

The communication unit 33 is a communication circuit connected to the communication line 4 via a wireless access point using a method that conforms to IEEE 802.11, for example. The communication unit 33 may be connected to the communication line 4 through a wire, rather than wirelessly. The terminal 3 exchanges information with the image forming apparatus 2 using the communication unit 33 via the communication line 4 and the server device 1.

The operation unit 35 includes operators such as operation buttons for inputting various instructions, and receives an operation by the user and supplies the controller 31 with a signal that matches the content of the operation. The operation unit 35 may include a touch screen that detects an operating body such as a finger of the user or a stylus pen.

The display unit 34 includes a liquid crystal display, and displays an image under control by the controller 31. A transparent touch screen of the operation unit 35 may be disposed as superposed on the liquid crystal display of the display unit 34.

1-5. Functional Configuration of Server Device

Figure 6:
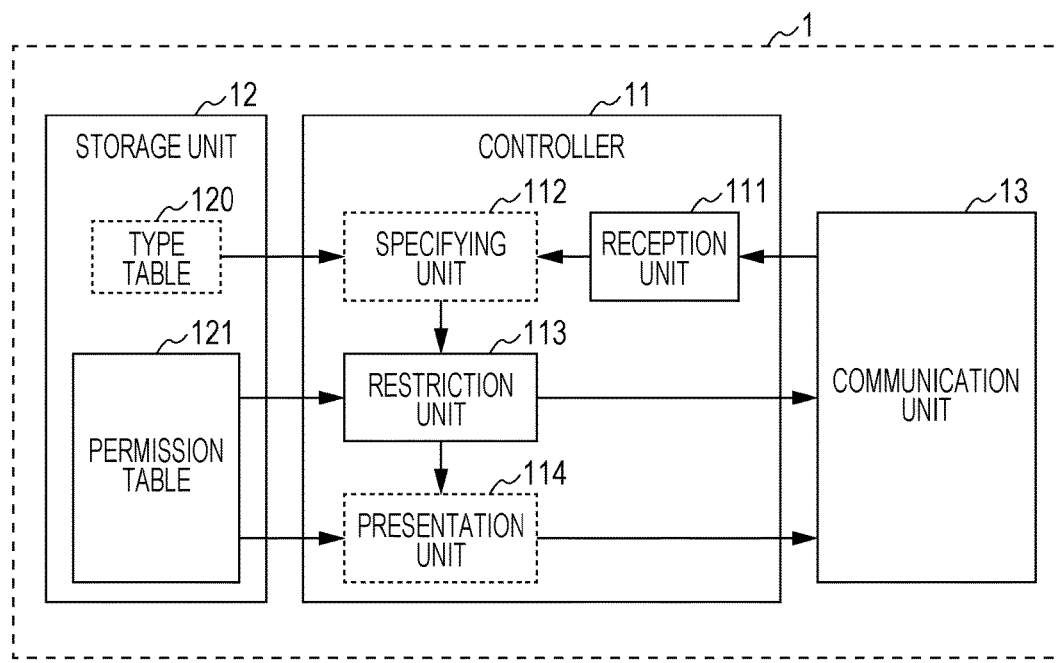
FIG. 6 illustrates the functional configuration of the server device.

FIG. 6 illustrates the functional configuration of the server device 1. In the server device 1, the controller 11 functions as a reception unit 111 and a restriction unit 113 illustrated in FIG. 6 by executing a program stored in the storage unit 12. The controller 11 may also function as a specifying unit 112 and a presentation unit 114 indicated by the broken line in FIG. 6 by executing a program.

The reception unit 111 receives an instruction for image formation from the communication unit 13, for example. The instruction for image formation has been delivered from the terminal 3 to the communication unit 13 via the communication line 4, for example. When the instruction is received, the reception unit 111 receives identification information on a user that provided the instruction, and the content of the instruction such as image data that indicate an image to be formed and setting for forming the image, for example. The identification information on a user may be a user ID etc. of a user that uses the terminal 3.

The specifying unit 112 specifies the user who provided the instruction received by the reception unit 111 in accordance with the identification information on the user included in the instruction. In the case where the received instruction includes authentication information such as a password that authenticates the user, the specifying unit 112 may authenticate the user on the basis of a set of the identification information on the user and the authentication information. Alternatively, the specifying unit 112 may send the set to an external authentication device via the communication unit 13 to cause the authentication device to perform authentication. The user may be specified by the reception unit 111. In this case, the specifying unit 112 may not be provided.

The specifying unit 112 may extract a condition for image formation from the content of an instruction received by the reception unit 111, and specify the type of a process indicated in the instruction on the basis of the type table 120. In the case where the content of the instruction includes identification information for identification of the type of the process such as a type name, the specifying unit 112 may specify the type of the process on the basis of the identification information. In this case, the storage unit 12 may not store the type table 120.

The restriction unit 113 determines whether or not use of processes that belong to the type specified from the content of the instruction received by the reception unit 111 is permitted for the user who provided the instruction in the permission table 121 of the storage unit 12. In the case where use of processes that belong to the type is not permitted for the user who provided the instruction, the restriction unit 113 restricts the image forming apparatus 2, e.g. by sending a control signal via the communication unit 13, such that the image forming apparatus 2 does not execute image formation according to the instruction.

The presentation unit 114 presents, to the user of the terminal 3, a correction for changing a process that belongs to the type specified from the content of the instruction received by the reception unit 111 to a process that belongs to a different type permitted for the user in the permission table 121 of the storage unit 12 in the case where the restriction unit 113 restricts the image forming apparatus 2.

In the case where use of processes that belong to the type specified from the content of the instruction received by the reception unit 111 is not permitted for the user who provided the instruction in the permission table 121 of the storage unit 12, the controller 11 may not retrieve and present to the user a process that belongs to a different type permitted for the user. That is, the controller 11 may not function as the presentation unit 114.

The presentation unit 114 may present the correction discussed above to the user of the terminal 3 also in the case where the image formation according to the instruction may not be executed because of a trouble etc. caused in the image forming apparatus 2. Also in this case, a process that belongs to a type permitted for the user is designated by providing an instruction again in accordance with the presented correction, and therefore execution of image formation is not restricted.

In the case where the image forming apparatus 2 is restricted, the restriction unit 113 may make a correction for changing a process that belongs to the type specified from the content of the instruction received by the reception unit 111 to a process that belongs to a different type permitted for the user in the permission table 121 of the storage unit 12, and control the image forming apparatus 2 so as to execute image formation in accordance with the corrected instruction. In this case, the presentation unit 114 may present the content of the correction to the terminal 3 after image formation is executed, or the presentation unit 114 may not be provided.

1-6. Operation of Server Device

Figure 7:
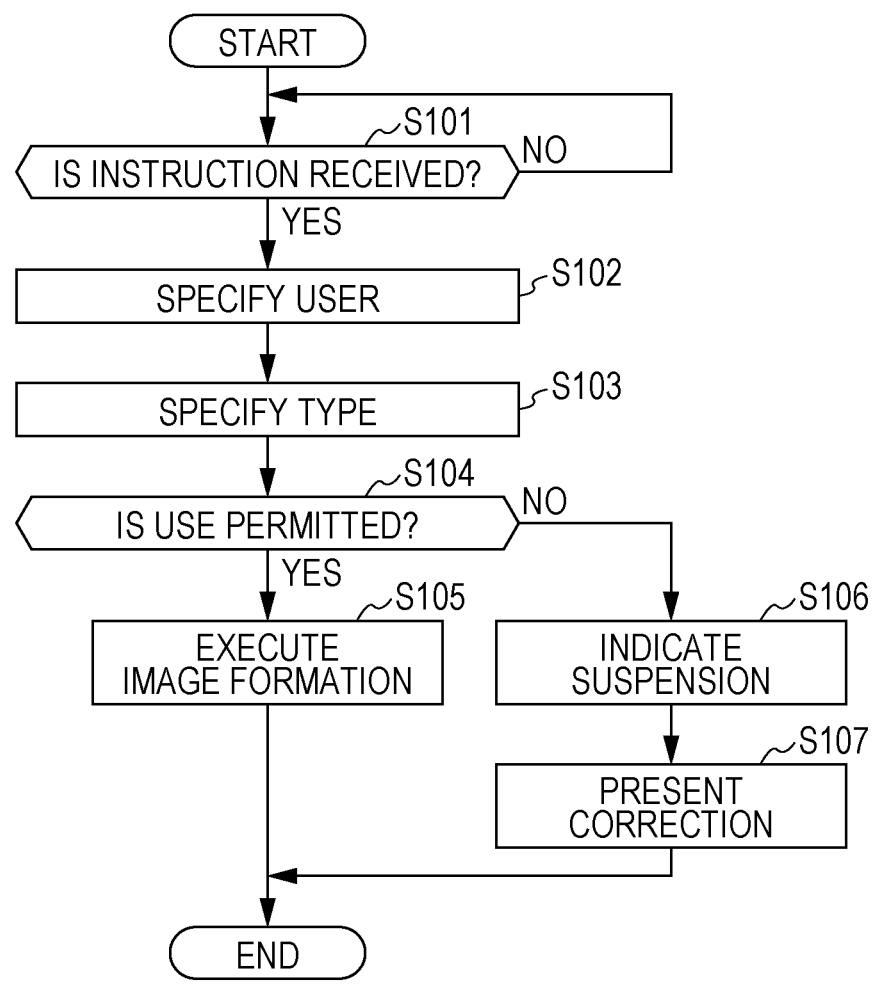
FIG. 7 is a flowchart illustrating the flow of operation of the server device.

FIG. 7 is a flowchart illustrating the flow of operation of the server device 1. The controller 11 of the server device 1 determines whether or not an instruction for image formation has been received from the terminal 3 (step S101). While it is determined that such an instruction has not been received (step S101: NO), this determination is continuously made. When it is determined that an instruction for image formation has been received (step S101: YES), the controller 11 specifies a user that provided the instruction (step S102).

The controller 11 specifies the type of a process indicated in the received instruction from the content of the instruction (step S103). The controller 11 determines, on the basis of identification information on the specified user and identification information (type name) on the type specified from the content of the received instruction, whether or not use of processes that belong to the type is permitted for the user (step S104).

In the case where it is determined that use of processes of the type specified from the content of the received instruction is permitted for the user who provided the instruction (step S104: YES), the controller 11 executes image formation indicated in the instruction (step S105). In step S105, image formation is executed at a timing based on the type of a process specified in step S103. For example, in the case where the type discussed above requests the user to perform an operation for confirmation immediately before image formation, the controller 11 requests the user to perform an operation for confirmation in step S105.

In the case where it is determined that use of the process discussed above is not permitted for the user (step S104: NO), the controller 11 transmits, to the terminal 3, a signal indicating that the process of the image formation according to the instruction is suspended (step S106). When the signal is received, the terminal 3 informs the user that the process of the image formation is suspended through display on the display unit 34, for example.

In the case where the process of the image formation according to the instruction has been suspended, the controller 11 determines whether or not there is any process of a type that is different from the type specified by the instruction and that the user discussed above is permitted to use in the permission table 121 stored in the storage unit 12. In the case where there is any such process, the controller 11 sends a control signal to the terminal 3 so as to present a correction for changing a process according to the instruction and that is not permitted for the user to a process permitted for the user (step S107).

Through the operation described above, the server device 1 of the image forming system 9 restricts processes to be used by the user for each of the categories of processes classified in accordance with a condition related to the timing of image formation.

2. Modifications

While the exemplary embodiment has been described above, the exemplary embodiment may be modified as described below. The following modifications may be combined with each other.

2-1. Modification 1

In the exemplary embodiment discussed above, the storage unit 12 stores the permission table 121 which indicates, for each of types of processes classified in accordance with a condition related to the timing of image formation, whether or not it is possible for each user to use processes that belong to the type. However, the storage unit 12 may store the permission table 121 which stores, for each of plural types, the number of times that each user may use processes that belong to the type. The storage unit 12 which stores the permission table 121 is an example of a storage unit that stores, for each of processes that belong to the plural types, the number of times that each user may use the process.

FIG. 8 illustrates an example of the permission table 121 according to Modification 1. The permission table 121 illustrated in FIG. 8 stores the number of times that processes that belong to each type may be used in correlation with user names for identification of the users. In this case, the restriction unit 113 may reference the permission table 121 to restrict the image forming apparatus 2 so as not to execute image formation when the image formation is to be executed more than the number of times determined for the user for the processes that belong to the specified type in the permission table 121.

The permission table 121 may indicate the number of times that processes may be used in a determined period for each type, or may indicate the number of times that processes may be used at the present moment for each type. For example, the controller 11 may rewrite the number of times of use when image formation has been executed, by subtracting the number of times that processes have been used from the number of times indicated in correlation with the type of processes that match a condition related to the timing of image formation in the permission table 121.

2-2. Modification 2

The processes that belong to the types permitted for the users may differ depending on the time zone. In this case, the permission table 121 may indicate identification information on the types of processes permitted for the users for each time zone in correlation with user names for identification of the users.

FIG. 9 illustrates an example of the permission table 121 according to Modification 2. In the permission table 121 illustrated in FIG. 9, the morning and the afternoon are provided as time zones. The type names of processes permitted for the users are different between the morning and the afternoon. According to this configuration, the server device 1 varies the types of processes to be restricted for the users in accordance with the time zone in which image formation is executed.

The time zones indicated in the permission table 121 may be different among the users. The timing when the restriction unit 113 references the permission table 121 may be the time point when image formation is executed or the time point when an instruction for image formation has been received.

2-3. Modification 3

In the exemplary embodiment discussed above, the permission table 121 indicates whether or not it is possible for each user to use processes that belong to each type. However, the permission table 121 may indicate whether or not it is possible for each group to which the users belong to use processes that belong to each type.

Figure 10:
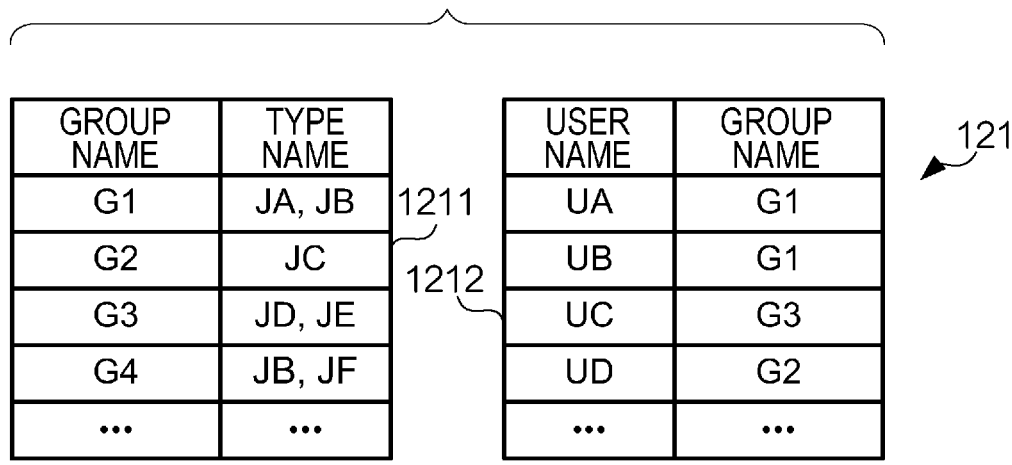
FIG. 10 illustrates an example of the permission table according to Modification 3.

FIG. 10 illustrates an example of the permission table 121 according to Modification 3. The permission table 121 illustrated in FIG. 10 includes a first permission table 1211 and a second permission table 1212. The first permission table 1211 indicates group names for identification of groups to which the users belong and type names as identification information on the types of processes that the groups are permitted to use in correlation with each other. The second permission table 1212 indicates user names for identification of the users and group names of groups to which the users belong in correlation with each other. That is, the storage unit 12 which stores the first permission table 1211 is an example of a first storage unit that stores, for each of plural categories, whether or not it is possible for each group to use processes that belong to the category, and the storage unit 12 which stores the second permission table 1212 is an example of a second storage unit that stores the users that belong to each group.

In this case, in the case where use of processes that belong to the type specified from the content of the received instruction is not permitted for a group to which the user who provided the instruction belongs in the permission table 121, the restriction unit 113 may restrict the image forming apparatus 2 so as not to execute image formation according to the instruction.

In addition to indicating whether or not it is possible for each group to use processes that belong to a type, the permission table 121 may indicate whether or not it is possible for each user to use processes that belong to the type. In the case where there is a contradiction between the possibility determined for a certain user to use processes that belong to a type and the possibility determined for a group to which the user belongs to use processes that belong to the type, one of the two possibilities may be determined using such information by a method determined in advance. One such method may be determined for the permission table 121, or one such method may be determined for each of the groups or the users. Examples of the method include giving priority to the indications for the groups, giving priority to the indications for the users, computing the logical sum thereof, computing the logical product thereof, and so forth.

2-4. Modification 4

The reception unit 111 may receive a correction for a received instruction in the case where the restriction unit 113 has restricted the image forming apparatus 2. In this configuration, when the user makes a correction for changing a process that belongs to the type specified from a restricted instruction to a process that belongs to a type permitted for the user, the image forming apparatus 2 executes image formation in accordance with the corrected instruction.

The reception unit 111 may receive a correction for the possibility of use stored in the storage unit 12 in the case where the restriction unit 113 has restricted the image forming apparatus 2. In this case, the storage unit 12 may correct the possibility of use in the case where a correction for the possibility of use has been received from the reception unit 111.

2-5. Modification 5

In the exemplary embodiment discussed above, the permission table 121 indicates names (type names) of the types to which processes that the users are permitted to use belong in correlation with names (user names) of the users. However, the permission table 121 may indicate type names that indicate the types of processes that the users are prohibited from using. In short, the possibility for each user to use processes that belong to a category may be determined on the basis of the permission table 121 for each of the categories of processes classified in accordance with a condition related to the timing of image formation.

2-6. Modification 6

In the exemplary embodiment discussed above, the server device 1 and the image forming apparatus 2 are separate from each other. However, the image forming apparatus 2 may have the function of the server device 1. In this case, the controller 21 and the storage unit 22 of the image forming apparatus 2 may function as a control apparatus that controls the image forming apparatus 2.

2-7. Modification 7

The programs executed by the controller 11 of the server device 1 may be provided as stored in a computer-readable recording medium such as a magnetic recording medium such as a magnetic tape and a magnetic disk, an optical recording medium such as an optical disc, a magneto-optical recording medium, and a semiconductor memory. Alternatively, the programs may be downloaded by way of a communication line such as the Internet. A variety of devices, besides the CPU, may be used as a controller exemplified by the controller 11 discussed above. For example, a dedicated processor etc. may be used.

2-8. Modification 8

In the exemplary embodiment discussed above, the storage unit 12 preliminarily stores, for each of plural types of processes, whether or not it is possible for each actual user to use processes that belong to the type. However, the storage unit 12 may store the possibility of such use for each mission that the user is scheduled to assume.

Figure 11:
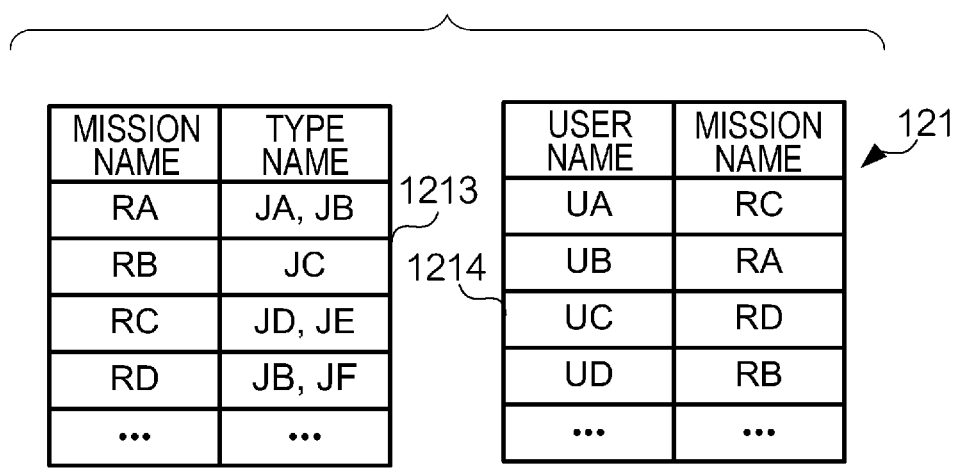
FIG. 11 illustrates an example of the permission table according to Modification 8.

FIG. 11 illustrates an example of the permission table 121 according to Modification 8. The permission table 121 illustrated in FIG. 11 includes a third permission table 1213 and a fourth permission table 1214. The third permission table 1213 indicates, for each of plural missions, the type names of types to which processes permitted to be used in the mission belong. In the fourth permission table 1214, mission names that indicate the missions are assigned to user names that indicate the users. The users and the missions may be correlated with each other in a one-to-one correspondence, or one mission may be assigned to plural users.

The controller 11 may receive an instruction for changing the third permission table 1213 from an external device via the communication unit 13. In this case, for example, the user may operate the operation unit 35 of the terminal 3 to send the instruction to the server device 1, and the controller 11 of the server device 1 may receive the instruction. In the case where the instruction is for preparing a new mission, the controller 11 may prepare a collection of type names to be correlated with the new mission on the basis of a collection of type names that have already been indicated in correlation with a mission in the third permission table 1213.

The missions may be assigned to groups to which the users belong, rather than being assigned to the users. FIG. 12 illustrates an example of the fourth permission table 1214 in which mission names are assigned to group names that indicate groups. In this case, the controller 11 may reference the second permission table 1212 illustrated in FIG. 10, for example, to specify users that belong to the groups.

That is, the storage unit 12 which stores the third permission table 1213 is an example of a third storage unit that stores plural missions, for which it is determined, for each of categories of processes, whether or not it is possible to use processes that belong to the category, and the storage unit 12 which stores the fourth permission table 1214 is an example of a fourth storage unit that stores the missions as assigned to the users or groups to which the users belong.

In this case, in the case where use of processes that belong to the type specified from the content of a received instruction is not permitted for a mission assigned to the user who provided the instruction in the permission table 121 and hence not permitted for the user, the restriction unit 113 may restrict the image forming apparatus 2 so as not to execute image formation according to the instruction.

2-9. Modification 9

In Modification 8 discussed above, one mission name is assigned to a user name or group name in the fourth permission table 1214. However, plural mission names may be assigned to one user name or group name.

FIG. 13 illustrates an example of the fourth permission table 1214 according to Modification 9. The fourth permission table 1214 illustrated in FIG. 13 stores assignment of each mission to user names that indicate the users.

Specifically, in the case where a "circular mark" is provided in the field corresponding to a combination of a user name and a mission name in the fourth permission table 1214 of FIG. 13, it is meant that a mission with the mission name is assigned to a user with the user name. In the case where an "x mark" is provided in the field, it is meant that the mission is not assigned to the user.

For example, while missions identified with mission names "RA", "RB", "RC", and "RD" are assigned to a user with a user name "UA", a mission identified with a mission name "RE" is not assigned to the user.

In the fourth permission table 1214, authority computation setting is determined for each user name. The authority computation setting is indicated as "product" or "sum".

In the case where the authority computation setting is indicated as "product", the possibility of use determined for plural missions assigned to a user is evaluated using the logical product. That is, use of processes that belong to a type prohibited for a mission, of the plural missions assigned to the user, is prohibited for the user even if use of such a process is permitted for the other missions. That is, setting in which the authority computation setting is indicated as "product" is first setting in which, in the case where plural missions are assigned to a user, the image forming apparatus is restricted when use of processes that belong to a type is not permitted for one or more of the plural missions. When the authority computation setting is indicated as "product", there is generally a less chance of a process being permitted.

In the case where the authority computation setting is indicated as "sum", meanwhile, the possibility of use determined for plural missions assigned to a user is evaluated using the logical sum. That is, use of processes that belong to a type permitted for a mission, of the plural missions assigned to the user, is permitted for the user even if use of such a process is prohibited for the other missions. That is, setting in which the authority computation setting is indicated as "sum" is second setting in which, in the case where plural missions are assigned to a user, the image forming apparatus is restricted only when use of processes that belong to a type is not permitted for any of the missions. When the authority computation setting is indicated as "sum", there is generally a better chance of a process being permitted.

That is, the storage unit 12 which stores the fourth permission table 1214 according to Modification 9 is an example of a storage unit that stores one of the first setting in which, in the case where plural missions are assigned to a user or a group, the image forming apparatus is restricted when use of processes that belong to a type is not permitted for one or more of the missions and the second setting in which the image forming apparatus is restricted only when use of processes that belong to a type is not permitted for any of the missions.

In this case, the restriction unit may restrict the image forming apparatus 2 by applying the authority computation setting stored in the fourth permission table 1214 in the case where plural missions are assigned to a user that provided a received instruction or a group to which the user belongs in the fourth permission table 1214.

2-10. Modification 10

In Modification 9 discussed above, the authority computation setting is determined for each user name in the fourth permission table 1214. However, the authority computation setting may be changed by the user. For example, the reception unit 111 which is implemented by the controller 11 may receive an instruction for changing the authority computation setting stored in the fourth permission table 1214. In this case, the storage unit 12 may change the authority computation setting in accordance with an instruction for changing the authority computation setting when the instruction is received.

2-11. Modification 11

The third permission table 1213 discussed above indicates, for each of plural missions, the type name of a type to which processes permitted to be used in the mission belong. However, the third permission table 1213 may indicate the number of times of use, for example, for each mission for each of types to which processes permitted to be used in the mission belong. The processes that belong to the types permitted for the missions may differ depending on the time zone.

The mission assigned to the user may differ depending on the time zone. In this case, the fourth permission table 1214 may indicate identification information (mission name) on the mission assigned to the user for each time zone in correlation with a user name for identification of the user. FIG. 14 illustrates an example of the fourth permission table 1214 according to Modification 11. According to the fourth permission table 1214, missions with mission names "RA" and "RB" are assigned to a user with a user name "UA" in the morning, but a mission with a mission name "RC" is assigned to the user in the afternoon, for example.

The mission assigned to the user may differ depending on the operating state of the image forming apparatus 2, rather than the time zone discussed above. FIG. 15 illustrates an example of the permission table 121 in which different missions are assigned in accordance with the operating state. In the permission table 121, the operating state is divided into two divisions, namely low operation and high operation, through a comparison with a determined threshold or the like, for example. Different types of processes are assigned to the users between the two operating states. The controller 11 may determine whether the operating state is low operation or high operation on the basis of a comparison between the number of instructions sent to the image forming apparatus 2 or the like and the determined threshold, for example.

2-12. Modification 12

The server device 1 or the image forming apparatus 2 may receive, from the terminal 3, a "group of serial instructions" by determining the order of plural instructions for image formation. In this case, the plural instructions included in one group of instructions may include conditions for image formation that are different from each other.

Figure 16:
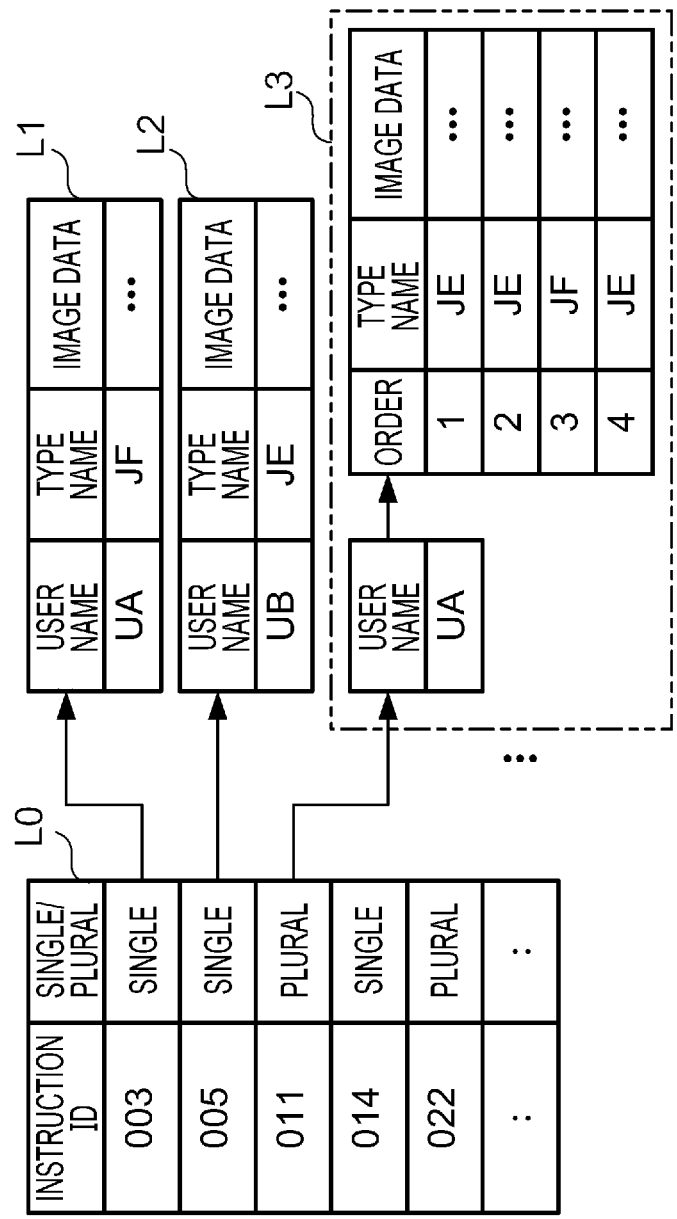
FIG. 16 illustrates a group of serial instructions.

FIG. 16 illustrates a group of serial instructions. The terminal 3 provides instructions for forming an image to the image forming apparatus 2 via the server device 1. Instruction IDs for mutual identification are assigned to the instructions from the terminal 3 as indicated in a list L0 of FIG. 16, and the instructions from the terminal 3 are correlated with information that indicates whether each instruction is composed of a single instruction or plural instructions. Instructions composed of a single instruction, of the instructions included in the list L0, are correlated with a single instruction that includes a set of a user name, a type name, and image data as indicated by an instruction L1 and an instruction L2 indicated in FIG. 16.

On the other hand, instructions composed of plural instructions, of the instructions included in the list L0, are correlated with plural instructions indicated under one user name by a set of image data and a type name of an instruction for forming an image using the image data with the order of execution assigned to each of the instructions as with a group of instructions L3 indicated in FIG. 16. The plural instructions to which the order of execution has been assigned are referred to as a "group of serial instructions".

Figure 17:
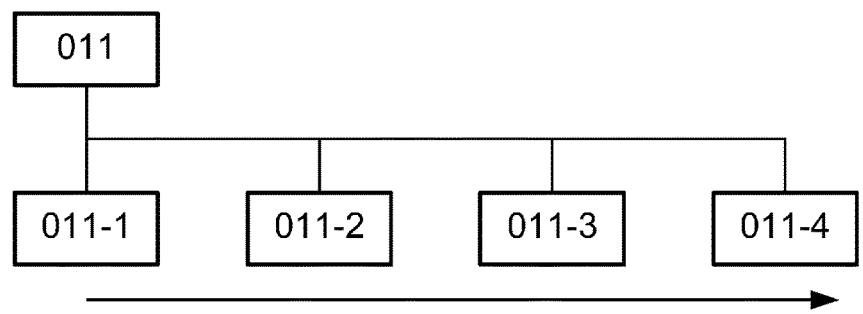
FIG. 17 indicates the order in which the group of serial instructions are executed.

FIG. 17 indicates the order in which the group of serial instructions are executed. The group of instructions L3 illustrated in FIG. 16 are all correlated with an instruction with an instruction ID "011" in the list L0, and orders from 1 to 4 are assigned to the four instructions which compose the group of instructions L3. When the instructions are represented as "011-1", "011-2", "011-3", and "011-4", all the instructions have an instruction with an instruction ID "011" as their parent, and are executed in this order.

The authority of a user to accumulate instruction information in the storage unit 12 and the authority of the user to confirm or retrieve the accumulated instruction information may be different from each other. For example, while a certain user may accumulate instruction information on processes of a type (PIN code type) that may be retrieved by entering a PIN code and instruction information on processes of a type (password type) that may be retrieved by entering a password, the user may be given the authority to retrieve only the processes of the PIN code type.

In the case where the authority permitted for a certain user is varied in accordance with the time zone, the types of processes may be different between instruction information that the user is permitted to accumulate during accumulation and instruction information that the user is permitted to retrieve during retrieval.

In the case where instruction information of the PIN code type and instruction information of the password type are stored in a common storage region during accumulation, the instruction information of the PIN code type and the instruction information of the password type are present in a mixed manner in the storage region. In this state, in the case where the user selects all of the plural pieces of instruction information stored as a group of serial instructions in the common storage region and provides an instruction (final instruction) for execution of such pieces of instruction information, the server device 1 confirms the authority for retrieval sequentially from the first piece of instruction information, and suspends execution of an instruction indicated in a piece of instruction information, for which an authority violation has been detected. In this event, the server device 1 may suspend execution of instructions indicated in pieces of instruction information that follow the piece of instruction information which indicates the suspended instruction, or may not confirm the authority for retrieval for such pieces of instruction information.

For example, in the case where an instruction with a type name "JE" is of the "PIN code type" discussed above and an instruction with a type name "JF" is of the "password type" discussed above, the order of the types of the instructions accumulated as indicated in FIG. 16 is PIN code type, PIN code type, password type, and PIN code type. In this case, an authority violation is detected for the third instruction information since a user is required to enter a password, rather than a PIN code, to retrieve the instruction information, and processes according to the third and subsequent instruction information are not executed.

The retrieval authority may be confirmed initially collectively for all the group of serial instructions.

2-13. Modification 13

In Modification 12 discussed above, the server device 1 sequentially confirms the retrieval authority for all the instructions included in the group of serial instructions and, when an instruction for which the retrieval authority is not provided is detected, suspends execution of the instruction and all the subsequent instructions. However, the server device 1 may suspend execution of an instruction for which the retrieval authority is provided and all the subsequent instructions in the case where an authority violation has been detected during execution of such an instruction. The timing to confirm the authority to execute such instructions may be at the time of execution thereof, which is later than the time of retrieval thereof.

Figure 18:
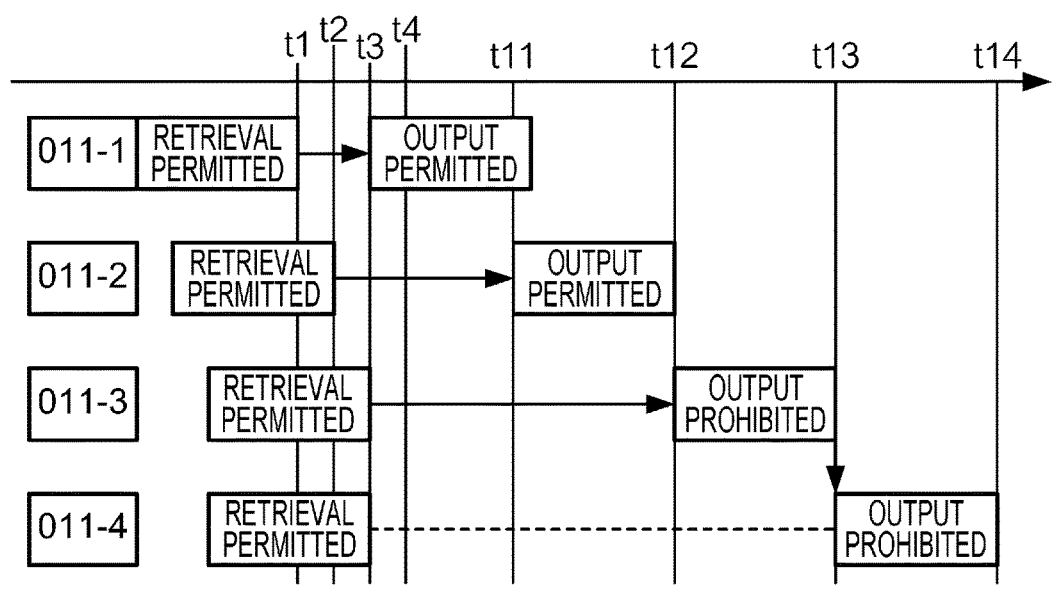
FIG. 18 illustrates variations in state of processes in a modification.

FIG. 18 illustrates variations in state of processes in this modification. For example, in the case where the user provides an instruction (hereinafter referred to as a "parent instruction") indicated with an instruction ID "011" illustrated in FIG. 17 and accumulates the instruction in the storage unit 12 of the server device 1, and when a group of serial instructions "011-1", "011-2", "011-3", and "011-4" correlated with the parent instruction are to be retrieved, the retrieval authority is confirmed at times t1, t2, t3, and t4, respectively. In the case where the user is given the retrieval authority for all the instructions (hereinafter referred to as "child instructions") that compose the group of serial instructions, for example, the server device 1 permits retrieval of the entire parent instruction.

The child instructions are executed in accordance with the assigned orders. When the child instructions are to be executed, the server device 1 confirms the authority to execute the processes themselves indicated in the instructions. For example, in the example illustrated in FIG. 18, the authority to execute the child instructions "011-1", "011-2", "011-3", and "011-4" discussed above is confirmed at times t11, t12, t13, and t14, respectively.

In the case where the type name "JE" indicates processes for forming a black-and-white image, the type name "JF" indicates processes for forming a color image, and the user is not given the authority to form a color image, the server device 1 detects an authority violation for the child instruction "011-3" at time t13. In this event, the server device 1 suspends execution of the child instruction "011-3", and also suspends execution of the following child instruction "011-4". In this case, further, the server device 1 may determine to save confirming the authority to execute the content of the child instruction "011-4" before time t14. The server device 1 may suspend execution of the parent instruction "011" at the timing when an authority violation for the child instruction "011-3" has been detected at time t13.

In the case where both the retrieval authority and the authority to execute identification information for which the retrieval authority is provided are to be determined as in this modification, the retrieval authority for the second instruction information may be checked at the same time as the retrieval authority for the first instruction information is being checked because of the resource of the image forming apparatus 2. However, the authority to execute instruction information for which the retrieval authority is provided, e.g. to print a document, may not be exercised by the image forming unit 25 concurrently for two pieces of instruction information.

Specifically, even if the retrieval authority for the second instruction information has been checked when the retrieval authority for the first instruction information has been checked and the authority to execute printing according to the instruction information is being checked, the authority to execute printing according to the second instruction information is not checked. Even in such a case, the child instruction "011-3" and the subsequent instructions are not output by canceling the parent instruction when an authority violation for execution of printing is detected.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control apparatus comprising:
a storage unit, including a memory, that stores, for each of categories of processes classified in accordance with a condition related to a timing of when a process is performed relative to when an instruction for the process is received, whether or not it is possible for each user to use processes that belong to the category;
a reception unit, implemented by one or more processors, that receives the instruction for the process; and
a restriction unit, implemented by the one or more processors, that specifies a category to which the process indicated in the instruction received by the reception unit belongs, and that restricts, in a case where use of processes that belong to the specified category is not permitted for a user that provided the instruction in the storage unit, execution of the process according to the instruction, determines whether or not there is any process of a type that is different from the process specified by the instruction that the user is permitted to perform, and presents a correction for changing the process if there is another process that the user is permitted to perform.

2. The control apparatus according to claim 1, wherein the categories are classified in accordance with a combination of the condition related to the timing and a condition related to at least one of a region for accumulation of data to be used in the process, whether or not to authenticate the user before the process, whether or not to request a confirmation before the process, and whether or not to delete data used in the process after execution of the process.

3. The control apparatus according to claim 1, wherein the storage unit includes
a first storage unit that stores whether or not the use is allowed for each group, and
a second storage unit that stores users that belong to each group, and
in a case where use of processes that belong to the specified category is not permitted for a group to which the user who provided the instruction belongs in the storage unit, the restriction unit restricts execution of the process according to the instruction.

4. The control apparatus according to claim 1, wherein the storage unit includes
a third storage unit that stores a plurality of missions, for which it is determined, for each of the categories of the processes, whether or not it is possible to use processes that belong to the category, and
a fourth storage unit that stores the missions as assigned to a user or a group to which the user belongs, and
in a case where use of processes that belong to the specified category is not permitted in the third storage unit for a mission assigned in the fourth storage unit to the user who provided the instruction or a group to which the user belongs, the restriction unit restricts execution of the process according to the instruction.

5. The control apparatus according to claim 4, wherein the fourth storage unit stores one of first setting in which, in a case where a plurality of missions are assigned to the user or the group, a process that belongs to the category is restricted when use of the process is not permitted for one or more of the plurality of missions and second setting in which a process that belongs to the category is restricted only when use of the process is not permitted for any of the plurality of missions, and
the restriction unit restricts the process by applying the first setting or the second setting stored in the fourth storage unit in a case where a plurality of missions are assigned to a user that provided the instruction or a group to which the user belongs in the fourth storage unit.

6. The control apparatus according to claim 5, wherein the reception unit receives an instruction for changing the first setting or the second setting stored in the fourth storage unit, and
the storage unit changes the first setting or the second setting when the reception unit has received the instruction.

7. The control apparatus according to claim 1, wherein the reception unit receives a correction for the instruction in a case where the restriction unit has restricted the process.

8. The control apparatus according to claim 1, further comprising:
a presentation unit, implemented by the one or more processors, that presents a correction for changing a process that belongs to a category specified from the instruction to a process that belongs to a different category permitted for the user in the storage unit in a case where the restriction unit has restricted the process.

9. The control apparatus according to claim 1, wherein the reception unit receives a correction for a possibility of the use in a case where the restriction unit has restricted the process, and
in a case where the correction for the possibility of the use has been received from the reception unit, the storage unit corrects the possibility of the use.

10. The control apparatus according to claim 1, wherein the storage unit stores, for each of the plurality of categories, a number of times that each user may use processes that belong to the category, and
the restriction unit restricts the process such that the user does not execute the processes that belong to the category more than the determined number of times.

11. The control apparatus according to claim 1, wherein each of the categories of processes is further classified in accordance a region of a plurality of regions for accumulation of data to be used in the process, the plurality of regions including a personal folder assigned to a user, a shared folder assigned to multiple users and a purpose-specific folder assigned for a specific purpose of use.

12. The control apparatus according to claim 1, wherein the condition is one of a plurality of conditions related to the timing of when the process is performed, the plurality of conditions including instantly processing an instruction for the process, processing the instruction for the process upon receipt of a confirmation from a user and processing the instruction for the process when designated by the user.

13. The control apparatus according to claim 1, wherein each of the categories of processes classified in accordance with (1) the condition related to the timing of when the process is performed relative to when the instruction for the process is received, (2) which of a plurality of folders a file of the process is saved to, (3) whether authentication is required, (4) whether confirmation is required and (5) whether the file will be retained or deleted in post-processing, and the storage unit further stores whether or not it is possible for each user to use processes that belong to each of the categories.

14. An image forming apparatus comprising:
a storage unit, including a memory, that stores, for each of categories of processes classified in accordance with a condition related to a timing of image formation is performed relative to when an instruction for a process is received, whether or not it is possible for each user to use processes that belong to the category;
a reception unit, implemented by the one or more processors, that receives the instruction for the process;
a processing unit, implemented by the one or more processors, that executes the process in accordance with the instruction received by the reception unit; and
a restriction unit, implemented by the one or more processors, that specifies a category to which the process indicated in the instruction received by the reception unit belongs, and that restricts, in a case where use of processes that belong to the specified category is not permitted for a user that provided the instruction in the storage unit, the processing unit so as not to execute the process according to the instruction, determines whether or not there is any process of a type that is different from the process specified by the instruction that the user is permitted to perform, and presents a correction for changing the process if there is another process that the user is permitted to perform.

15. The image forming apparatus according to claim 14, wherein each of the categories of processes is further classified in accordance a region of a plurality of regions for accumulation of data to be used in the process, the plurality of regions including a personal folder assigned to a user, a shared folder assigned to multiple users and a purpose-specific folder assigned for a specific purpose of use.

16. The image forming apparatus according to claim 14, wherein the condition is one of a plurality of conditions related to the timing of when the process is performed, the plurality of conditions including instantly processing an instruction for the process, processing the instruction for the process upon receipt of a confirmation from a user and processing the instruction for the process when designated by the user.

17. The image forming apparatus according to claim 14, wherein each of the categories of processes is classified in accordance with (1) the condition related to the timing of when the process is performed relative to when the instruction for the process is received, (2) which of a plurality of folders a file of the process is saved to, (3) whether authentication is required, (4) whether confirmation is required and (5) whether the file will be retained or deleted in post-processing, and the storage unit further stores whether or not it is possible for each user to use processes that belong to each of the categories.

18. A non-transitory computer readable medium storing a program causing a computer to execute a process, the process comprising:
storing, for each of categories of processes classified in accordance with a condition related to a timing of when a process is performed relative to when an instruction for the process is received, whether or not it is possible for each user to use processes that belong to the category;
receiving the instruction for the process;
specifying a category to which the process indicated by the received instruction belongs, and restricting, in a case where use of processes that belong to the specified category is not permitted for a user that provided the instruction, execution of the process according to the instruction;
determining whether or not there is any process of a type that is different from the process specified by the instruction that the user is permitted to perform; and
presenting a correction for changing the process if there is another process that the user is permitted to perform.

19. The non-transitory computer readable medium according to claim 18, wherein
each of the categories of processes is further classified in accordance a region of a plurality of regions for accumulation of data to be used in the process, the plurality of regions including a personal folder assigned to a user, a shared folder assigned to multiple users and a purpose-specific folder assigned for a specific purpose of use, and
the condition is one of a plurality of conditions related to the timing of when the process is performed, the plurality of conditions including instantly processing an instruction for the process, processing the instruction for the process upon receipt of a confirmation from a user and processing the instruction for the process when designated by the user.

20. The non-transitory computer readable medium according to claim 18, wherein each of the categories of processes is classified in accordance with (1) the condition related to the timing of when the process is performed relative to when the instruction for the process is received, (2) which of a plurality of folders a file of the process is saved to, (3) whether authentication is required, (4) whether confirmation is required and (5) whether the file will be retained or deleted in post-processing, and the storage unit further stores whether or not it is possible for each user to use processes that belong to each of the categories.

* * * * *